United States Patent [19]
Katoh et al.

[11] Patent Number: 5,555,487
[45] Date of Patent: Sep. 10, 1996

[54] INFORMATION PROCESSING APPARATUS HAVING LOCKABLE MODULAR SUBSYSTEMS

[75] Inventors: Katsutoshi Katoh, Tokyo-to; Michio Suzuki, Yokohama; Yoshiharu Uchiyama, Isehara; Kenshin Yonemochi, Kamakura, all of Japan

[73] Assignee: International Business Machines Corporation, Armonk, N.Y.

[21] Appl. No.: 279,124

[22] Filed: Jul. 22, 1994

[30] Foreign Application Priority Data

Jul. 23, 1993 [JP] Japan ................................. 5-182972

[51] Int. Cl.⁶ .............................. G06F 1/16; H05K 5/03; B65D 55/14
[52] U.S. Cl. ........................ 361/680; 361/684; 439/347; 439/366; 70/159
[58] Field of Search ................................. 439/296, 345, 439/347, 366; 70/58, 159; 364/708.1; 361/684–686, 726, 680

[56] References Cited

U.S. PATENT DOCUMENTS 4,620,756  11/1986  Gatti et al. ........................... 439/347 X

*Primary Examiner*—Michael W. Phillips
*Attorney, Agent, or Firm*—Andrew J. Dillon

[57] ABSTRACT

An information processing apparatus in which arbitrary removal of a device for processing information accommodated within an opening within the main body can be prevented, regardless of operation of an eject button or the like, and to provide an information processing apparatus in which such prevention can be realized in a simple structure and at a low cost. A removal preventing latch is provided and inserted into an aperture within the main body of the information processing apparatus and through a corresponding aperture within the device for processing information. A cover for the main body may then be selectively locked in a closed position, preventing removal of the removal preventing latch while the cover is closed. A keyboard is preferably mounted to the cover for the main body.

3 Claims, 9 Drawing Sheets

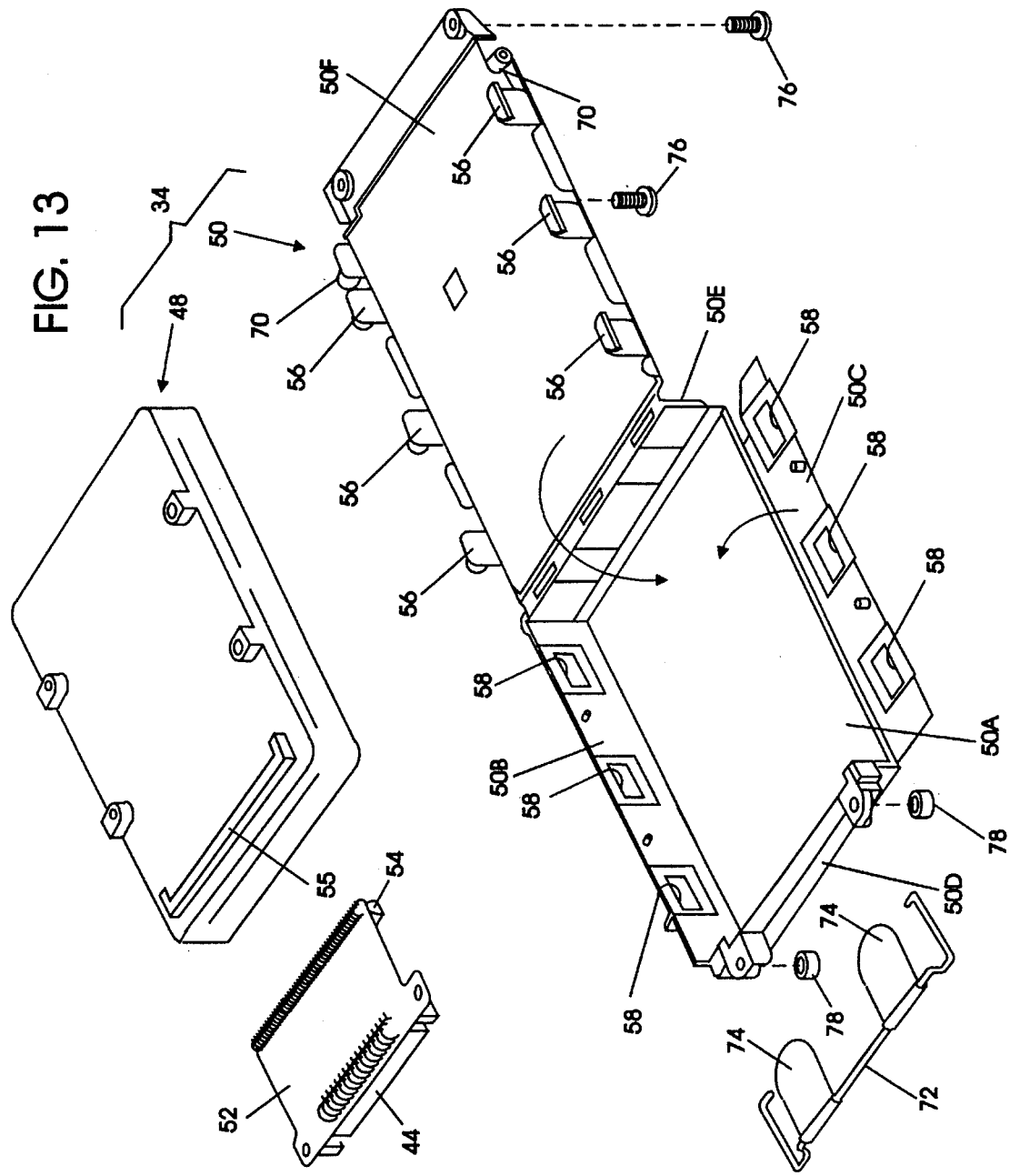

INFORMATION PROCESSING APPARATUS HAVING LOCKABLE MODULAR SUBSYSTEMS

BACKGROUND OF THE INVENTION

1. Technical Field:

The present invention mainly relates to a portable information processing apparatus, and more particularly to an information processing apparatus in which a device for processing information is accommodated within a main body so as to be installable and removable.

2. Description of the Related Art:

In an information processing apparatus, e.g., a portable information processing apparatus, a hard disk drive (HDD), a floppy disk drive (FDD), a battery or the like can be formed as a cartridge type package. This type of package, which is accommodated within the main body so as to be installable and removable, is widely used. In addition, an installable and removable type of thin card, e.g., a ROM card, may be used.

In this type of information processing apparatus, a user can install and remove the aforementioned HDD package, ROM card or the like. Accordingly, by replacing the HDD package, the ROM card or the like with an HDD package, a ROM card or the like storing different information, an information processing apparatus can be made to accommodate more functions. Further, communication between personal computers is possible if a communication card such as a modem card is used. Further, because various packages and cards can be installed and removed, maintenance of the data processor is facilitated.

The HDD package, the ROM card and the like are very expensive and information stored therein must be protected. Therefore, it is necessary to prevent arbitrary removal (such as theft) of the HDD package, the ROM card and the like from the main body.

In particular, the aforementioned ROM card or the like which is installable and removable can be easily removed from the main body of the data processing apparatus by operation of an eject button. Therefore, it is necessary to have a mechanism which can prevent removal of such devices from the main body, regardless of the operation of the eject button.

For a device such as a ROM card or the like accommodated within the main body of a data processing apparatus, a security mechanism formed by a cover or the like which completely covers an opening for inserting a card can be provided. In this case, the security mechanism is complicated and expensive, and the processor as a whole becomes large as space for the security mechanism must be provided. Further, if a modem card or the like equipped with a communication cable is used, the opening for inserting the card cannot be completely covered, and the problem of undesired removal of the device remains unsolved. As a result, a simple security mechanism has been desired for devices such as a ROM card or an HDD package.

SUMMARY OF THE INVENTION

In view of the facts set forth above, it is an object of the present invention to provide an information processing apparatus which can prevent arbitrary removal, from a main body of the processor, of a device for processing information accommodated within the main body, regardless of operation of an eject button or the like. It is also an object of the present invention to provide an information processing apparatus in which such prevention of arbitrary removal can be realized by a simple structure and at a low cost.

An information processing apparatus is provided which includes: a main body in which a device for processing information is accommodated so as to be installable and removable; an opening for a device provided in the main body and in which the device is inserted; a preventing member freely mountable to and removable from the main body, the preventing member preventing the device from being removed from the opening for a device when the preventing member is mounted to the main body; and preventing member removal preventing means for preventing removal of the preventing member from the main body.

In the information processing apparatus described herein, a device for processing information is inserted into an opening for the device within a main body so as to be accommodated within the main body. When the device is accommodated within the opening for the device of the main body, an preventing member is mounted to the main body so as to correspond to the device accommodated from the opening for the device. The device is thereby prevented from being removed from the exterior of the main body. Further, a preventing member removal preventing means prevents removal of the preventing member from the exterior of the main body.

In this way, by selectively using the preventing member, the device accommodated within the opening for the device can be prevented from being removed. In addition, even if a plurality of devices are inserted within the opening for the device, so as to be accommodated within the main body, a single preventing member can prevent all such devices from being arbitrarily removed from the main body. Such prevention can be realized in a simple structure and at a low cost.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 13 illustrates an exploded perspective view of the HDD pack shown in FIG. 12.

DETAILED DESCRIPTION OF PREFERRED EMBODIMENT

Figure 1:
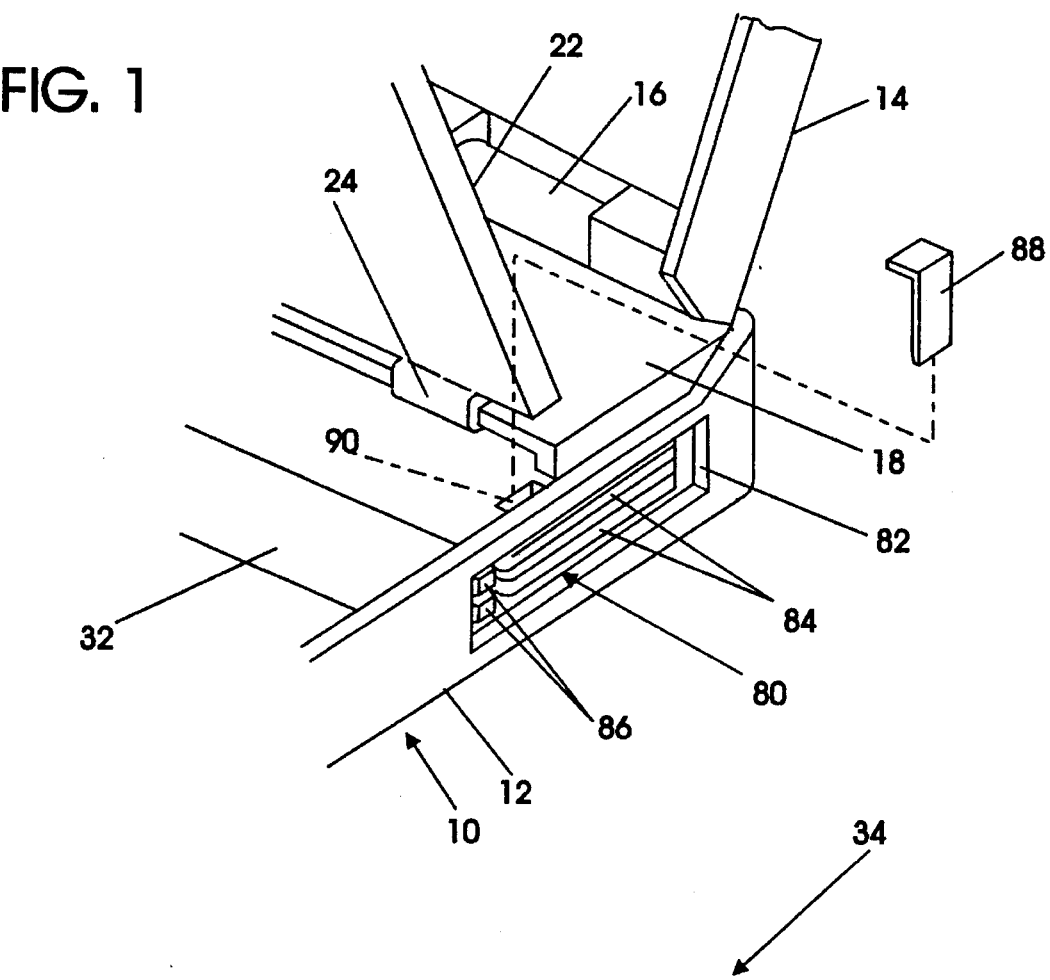
FIG. 1 illustrates a perspective view showing a structure of an preventing member and peripheral parts of a personal computer relating to an embodiment of the present invention.

An embodiment of the present invention will now be described in accordance with FIGS. 1–13. Perspective views of an exterior of a notebook-type personal computer 10 relating to an embodiment of the present invention are shown in FIGS. 2–5.

Personal computer 10 includes a thin (shallow bottom) box-shaped main body 12 whose upper portion is open, and a cover 14 provided so as be openable and closable with respect to the main body 12. In the same manner, as illustrated with respect to main body 12, cover 14 is formed in a thin (shallow bottom) box-shape, A pair of projections 16, which are each formed in a cylindrical shape, are integrally formed with cover 14 at the lower end portion of cover 14. The pair of projections 16 are axially supported at the rear side end portion of a supporting plate 18, which is provided at the rear side end portion of the main body 12 at a predetermined width. As a result, cover 14 can pivot around the pair of projections 16 so as to freely open and close main body 12. In addition, a display panel 20 is provided at a center of an open side, i.e., the reverse surface side of the cover 14.

A partition wall 32 is provided at the rear side of the main body 12. The partition wall 32 is formed by bending a thin metal plate into a predetermined shape. An unillustrated system main board is provided within the partition wall 32. A connector for an HDD pack, a terminal for a battery pack, a connector for an FDD pack (all unillustrated) and the like are also provided at the front side end portion of the partition wall 32.

In addition, a keyboard 22 is attached to the front side end portion of the supporting plate 18 of main body 12. Keyboard 22 serves as a cover. A pair of projections 24, which are each formed in a tongue-shape are integrally formed with keyboard 22 at the rear side end portion of keyboard 22. The pair of projections 24 is axially supported at the front side end portion of supporting plate 18. As a result, keyboard 22 can rotate around the pair of projections 24 so as to freely open and close the opening at the upper portion of main body 12. When the opening of the upper portion of main body 12 is closed by keyboard 22, the interior of main body 12 is covered by keyboard 22.

Figure 6:
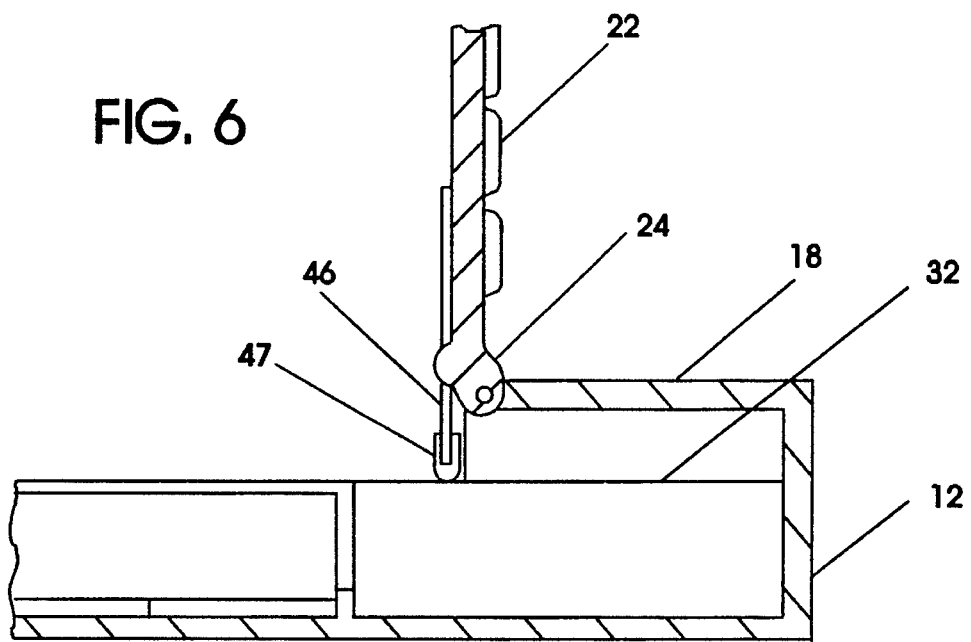
FIG. 6 illustrates a cross-sectional view taken along line 6—6 of FIG. 2 and showing a state in which the keyboard of the personal computer relating to the embodiment of the present invention is opened.
Figure 7:
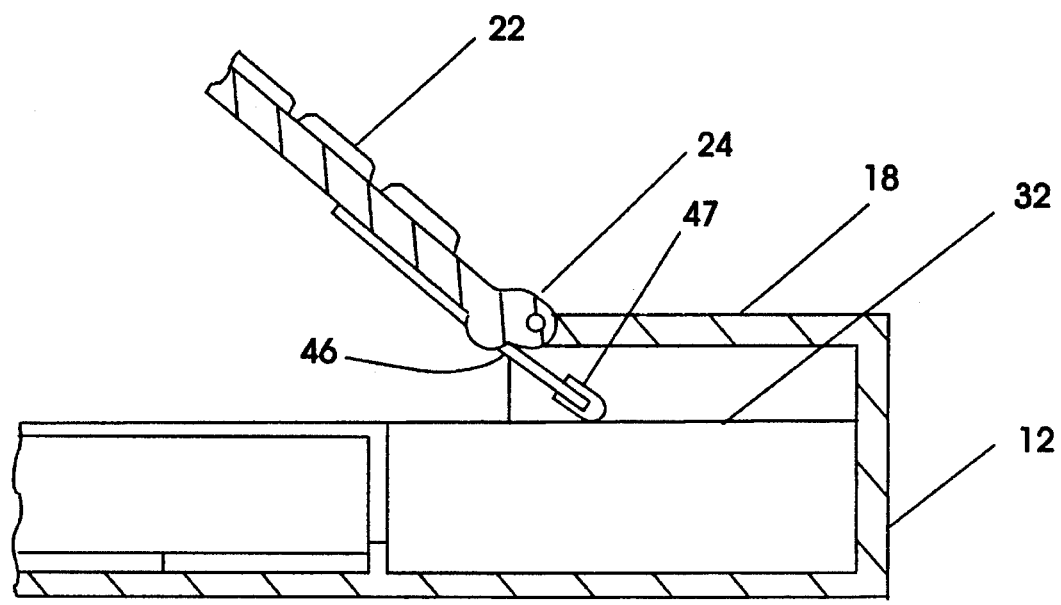
FIG. 7 illustrates a cross-sectional view taken along line 7—7 of FIG. 3 and showing a state in which the keyboard of the personal computer relating to the embodiment of the present invention is in the process of being opened.
Figure 8:
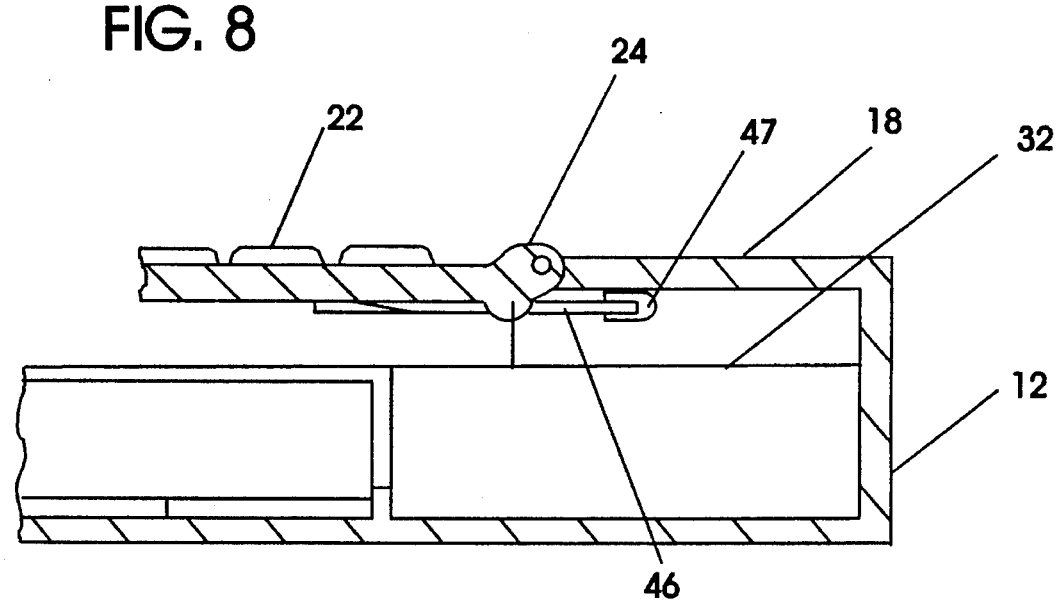
FIG. 8 illustrates a cross-sectional view taken along line 8—8 of FIG. 4 and showing a state in which the keyboard of the personal computer relating to the embodiment of the present invention is closed and the personal computer is used.

As shown in FIGS. 6–8, a holding member 46 is provided at the reverse surface side of keyboard 22. Holding member 46 is secured in the vicinity of one of projections 24. Holding member 46 is formed in a rectangular shape by a thin plate of metal having elasticity (e.g., steel). One end portion of holding member 46 is secured to reverse surface side of keyboard 22. A resin sliding portion 47 is secured to the other end portion (tip end portion) of holding member 46 so as to correspond to partition wall 32 directly below holding member 46. Holding member 46 always moves with keyboard 22 because it is secured to keyboard 22. Tip end portion of holding member 46 (sliding portion 47) can be engaged with partition wall 32. Namely, as shown in FIGS. 6–8, in a state in which keyboard 22 is closed (the state shown in FIG. 8), holding member 46 (sliding portion 47) is spaced apart from partition wall 32. As keyboard 22 is gradually opened, sliding portion 47 comes into contact with partition wall 32 such that holding member 46 (the state shown in FIG. 7) is elastically deformed. In a state in which keyboard 22 is opened (the state shown in FIG. 6), the dimensions of each portion are set so that holding member 46 (sliding portion 47) vertically engages with partition wall 32. Accordingly, holding member 46 can hold keyboard 22 in a state in which keyboard 22 is opened and substantially stands upright (the state shown in FIG. 6).

Opening and closing operations of cover 14 with respect to the above-described main body 12 and the opening and closing operations of keyboard 22 with respect to main body 12 are effected by operating an opening/closing operating latch 26 (a two-step operation) provided on a side portion of main body 12.

Further, an engaging projection 28 is provided at one end portion of the reverse surface side of keyboard 22. Engaging projection 28 is formed integrally with keyboard 22 so as to project toward a bottom wall of main body 12. An engaging hole 30 is formed in engaging projection 28 and an edge of engaging hole 30 can be engaged with a movable member 62. A description of movable member 62 is given in the following paragraphs.

Figure 9:
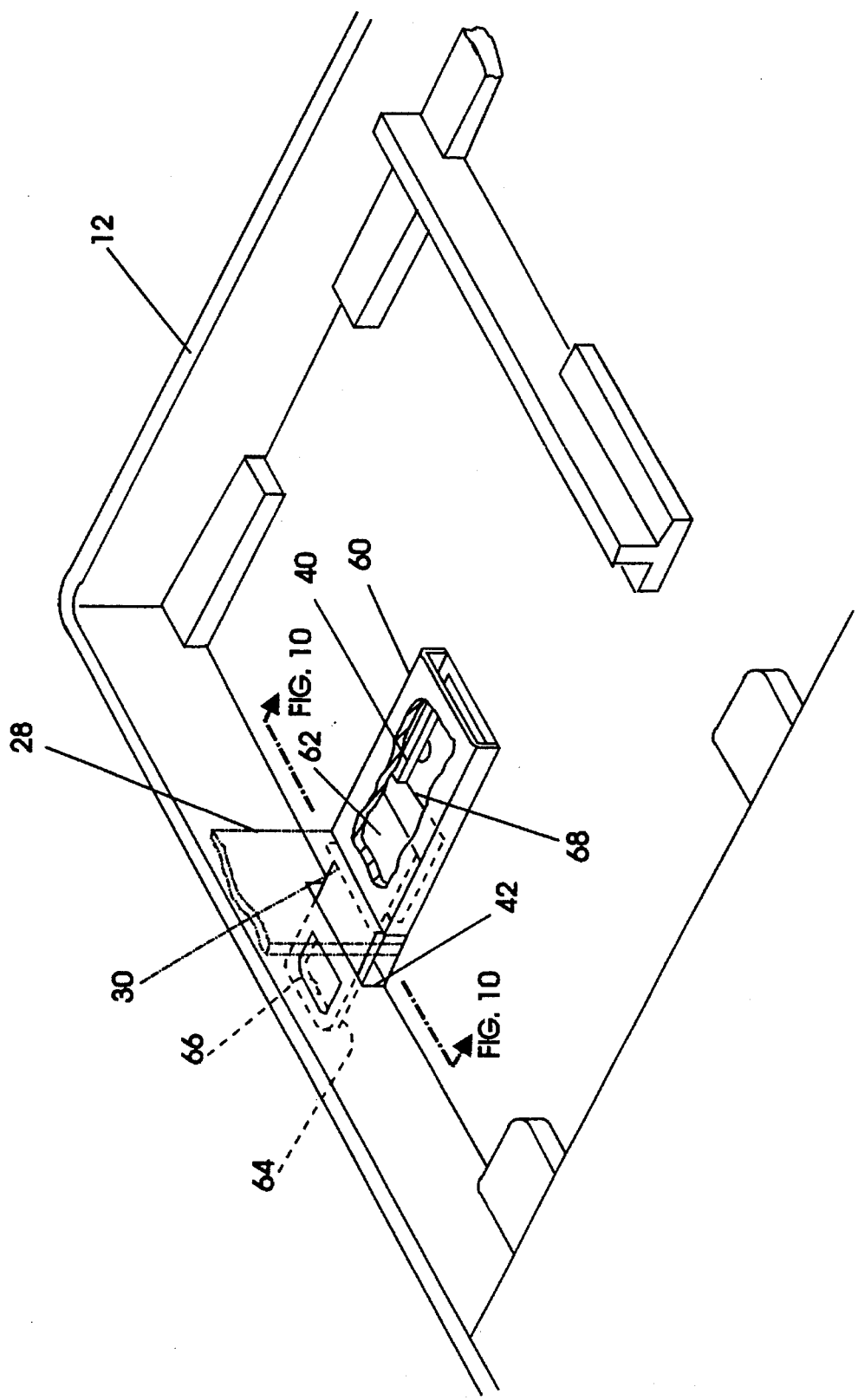
FIG. 9 illustrates a perspective view showing a structure of a movable member and peripheral parts of the personal computer relating to the embodiment of the present invention.
Figure 10:
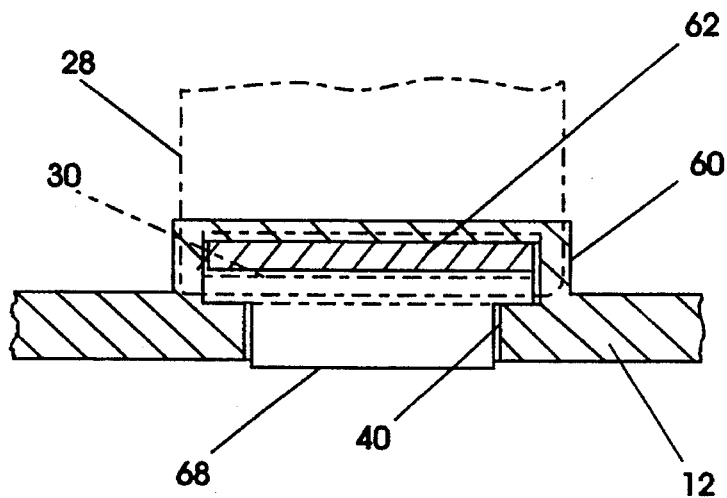
FIG. 10 illustrates a cross-sectional view taken along line 10—10 of FIG. 9 and showing the structure of the movable member and the peripheral parts of the personal computer relating to the embodiment of the present invention.
Figure 11:
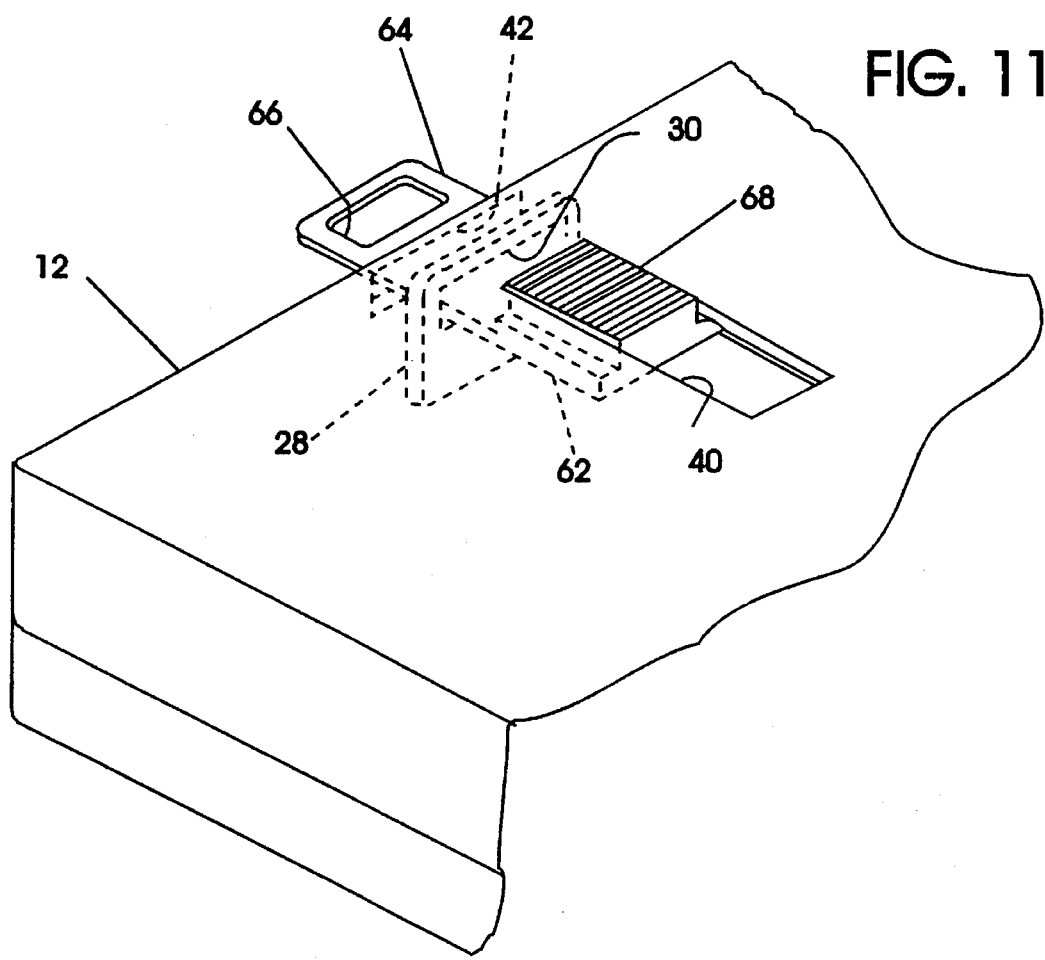
FIG. 11 illustrates a perspective view seen from the partially broken reverse surface and showing a state in which an engaging projection of the keyboard is engaged with the movable member of the personal computer relating to the embodiment of the present invention.

As illustrated in FIGS. 9–11 in detail, a guide 60 is provided at one end portion of the bottom wall of main body 12. Guide 60 is formed in an oblate rectangular shape and has a substantially U-shaped cross-section. Movable member 62 is slidably located at guide 60. Moreover, a through-hole 40 is formed at the bottom wall of main body 12 so as to correspond to guide 60. A through-hole 42 is formed at a side wall of main body 12 so as to correspond to guide 60 (movable member 62). A tip end engaging portion 64 of movable member 62 projects to the exterior from a side wall (through-hole 42) of main body 12 due to the sliding of movable member 62 along guide 60. In addition, a locking hole 66 is formed at the tip end engaging portion 64 of movable member 62. Further, an operating projecting portion 68 is formed at the reverse surface side of movable member 62. Operating projecting portion 68 projects further outwardly from guide 60 and through-hole 40. Operating projecting portion 68 is used to operate movable member 62 and can be operated from the exterior of main body 12 (bottom wall).

The tip end engaging portion 64 of movable member 62 corresponds to engaging projection 28 (engaging hole 30) of keyboard 22. The tip end engaging portion 64 can fit into engaging hole 30 of engaging projection 28 due to the sliding of movable member 62 along guide 60 when keyboard 22 is closed.

An HDD pack 34, a battery pack 36 and an FDD pack 38, which are referred to herein as devices for processing information, are respectively installed in main body 12. HDD pack 34, battery pack 36 and FDD pack 38 are freely installable to and removable from main body 12. They are respectively connected to the previously-described connectors provided within main body 12 when they are installed within main body 12.

Figure 12:
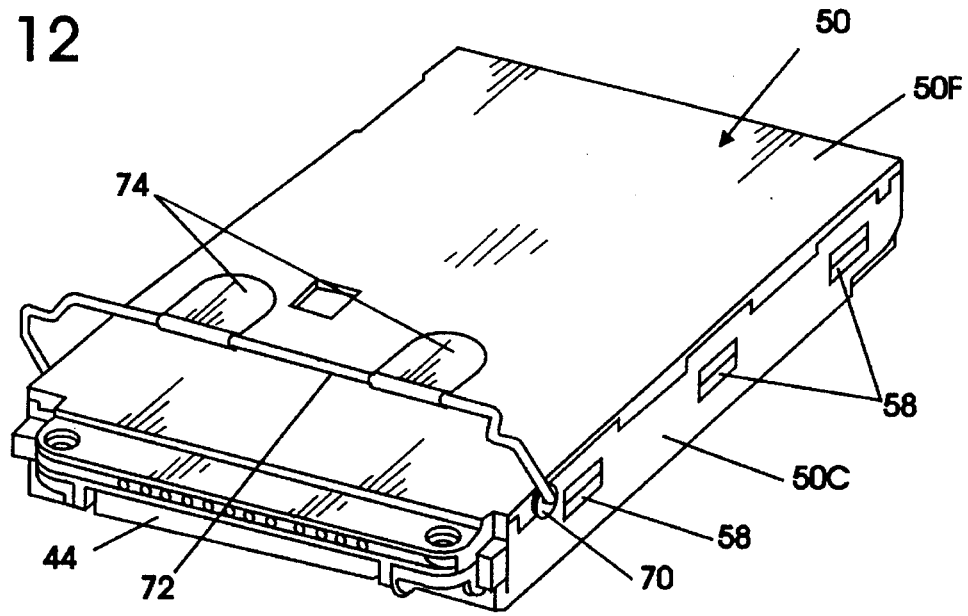
FIG. 12 illustrates a perspective view showing an HDD pack of the personal computer relating to the embodiment of the present invention as a unit.
Figure 2:
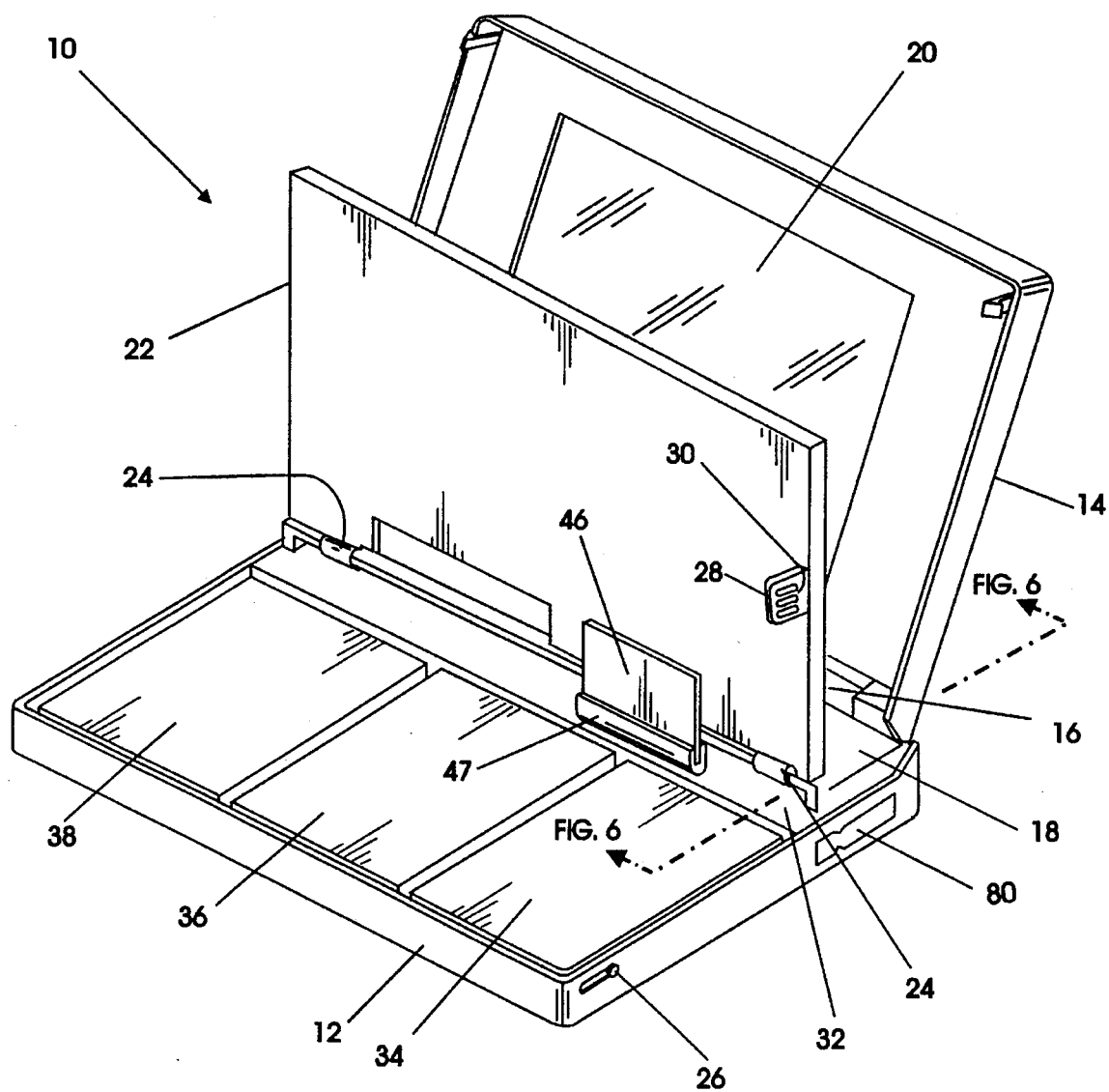
FIG. 2 illustrates a perspective view showing a state in which a keyboard of the personal computer relating to the embodiment of the present invention is opened.
Figure 3:
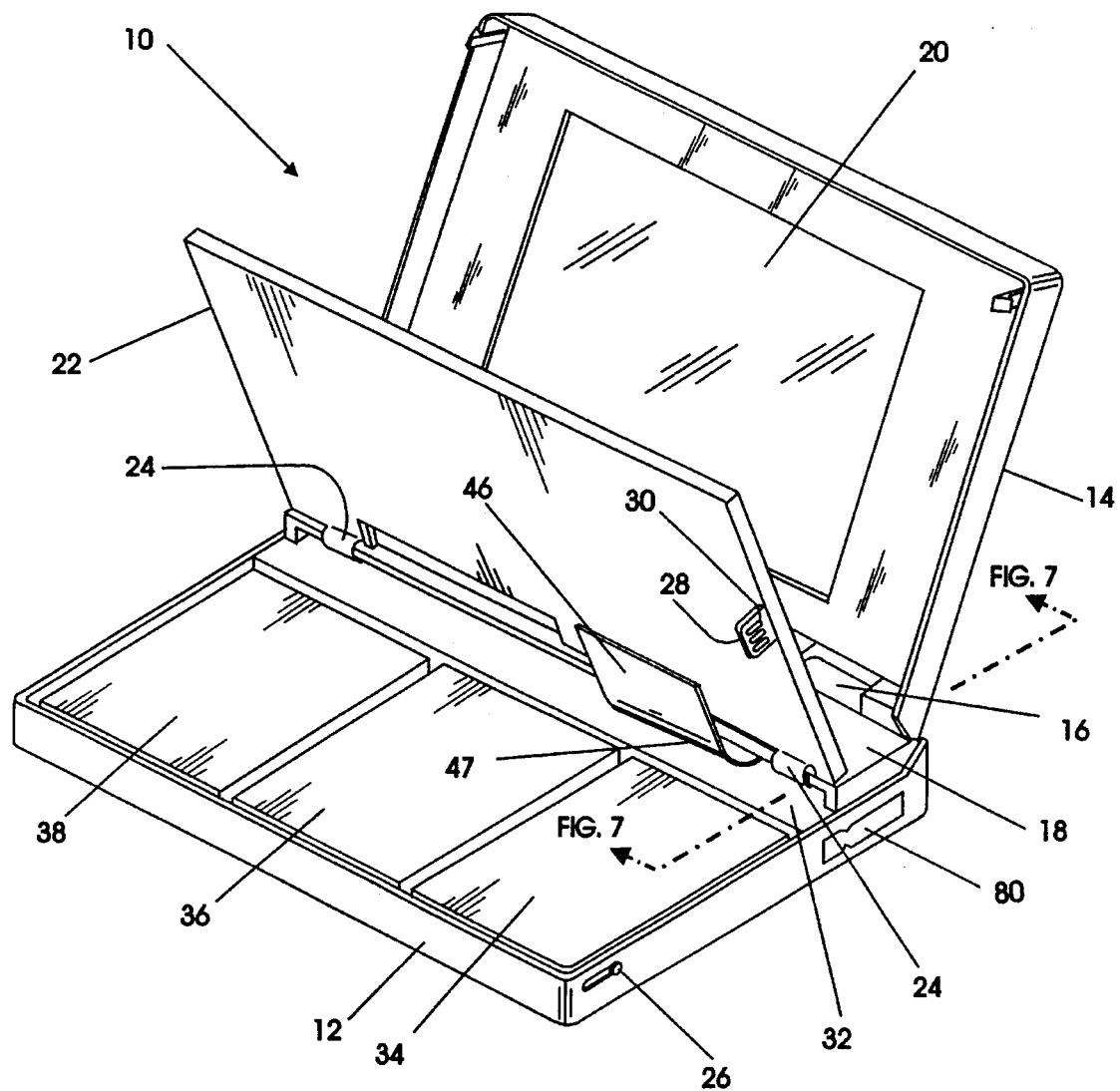
FIG. 3 illustrates a perspective view showing a state in which the keyboard of the personal computer relating to the embodiment of the present invention is in the process of being opened.

A description will be now given of the structure of HDD pack 34. As shown in FIGS. 12 and 13, HDD pack 34 includes an HDD main body 48 and an accommodating case 50.

A flexible substrate 52 is mounted to HDD main body 48. Flexible substrate 52 is formed of a resin material and is formed into a rectangular, flat plate shape. A connector 54 for HDD main body 48 is mounted to one end portion of flexible substrate 52. A connector 44 for the system main body is mounted to the other end portion of flexible substrate 52. Connector 54 for HDD main body 48 is connected to a connector 55 which is disposed on the front end portion of the upper surface of HDD main body 48.

On the other hand, the accommodating case 50 is formed of a resin material and is formed into a predetermined shape. Accommodating case 50 is formed by a bottom wall 50A, a pair of side walls 50B, 50C, a front end wall 50D, a rear end wall 50E, and a top wall 50F. One side wall 50B, front end wall 50D and rear end wall 50E do not pivot with respect to bottom wall 50A. The other side wall 50C, and top wall 50F can pivot with respect to bottom wall 50A due to resin hinges. A plurality of vertically projecting pawls 56 are formed at both end portions of top wall 50F. A plurality of rectangular openings 58 are formed at the pair of side walls 50B and 50C so as to correspond to the plurality of pawls 56. Mutually engageable pawls (reference numerals are omitted) are formed at the front and rear end portions of side wall 50C, and are also formed at respective end portions of front end wall 50D and rear end wall 50E.

A pair of supporting projections 70 are provided at the respective sides of front end portion of top wall 50F of accommodating case 50. The pair of supporting projections 70, each having a small hole formed in axially central portion thereof, are formed coaxially at front end portion of top wall 50F of accommodating case 50. A wire 72 is engaged with supporting projections 70. A pair of tapes 74 are adhered to wire 72.

In accordance with the following description, a HDD pack 34 having the above-described structure can be formed as a unit by accommodating the HDD main body 48 within accommodating case 50. First, HDD main body 48 is set on bottom wall 50A of accommodating case 50. At this time, connector 54 for HDD main body 48 of flexible substrate 52 is already connected to connector 55 of HDD main body 48. When HDD main body 48 is set on bottom wall 50A, a portion of flexible substrate 52 in the vicinity of connector 54 is bent down and an intermediate portion of flexible substrate 52 is bent up 180 degrees so that the bent-down portion and the bent-up portion of flexible substrate 52 contact each other. Thereafter, a portion of flexible substrate 52 in the vicinity of connector 44 for the system main body is bent 90 degrees. As a result, connector 54 for HDD main body 48 is directed toward the rear end wall 50E, while connector 44 for the system main body is directed toward the bottom wall 50A. (Connector 54 and connector 44 are orthogonal to each other.) Next, side wall 50C is folded so as to engage with front end wall 50D and rear end wall 50E. Then, top wall 50F is folded so that pawls 56 engage with the opening 58 edges. Thereafter, top wall 50F is fastened to front end wall 50D by bolts 76 and nuts 78 when both sides of connector 44 for system main body on the flexible substrate 52 are held. Finally, both end portions of wire 72 are elastically deformed so as to engage with supporting projections 70 of side walls 50B, 50C. Accordingly, HDD pack 34 includes the HDD main body 48, which is protected by accommodating case 50 formed by a single resin part (see FIG. 12).

As shown in FIG. 1, a two-storied card insertion port 80 is provided at a rear side of a side portion of the main body which accommodates HDD pack 34 within main body 12 (rear side of the partition wall 32). A PCMCIA card 84, which serves as a device for processing information, can be inserted from a side portion of main body 12 (an insertion opening 82, which is provided at the side wall and serves as an opening for a device). PCMCIA card 84 has connecting functions with a modem and external devices as well as other various functions. An eject button 86 is provided for each story of the two-storied card insertion port 80. PCMCIA card 84 can be removed from card insertion port 80 by operating eject button 86.

In addition, a preventing member 88 is provided at card insertion port 80 so as to be freely mountable and removable. Preventing member 88 is formed in a substantial L-shape and can be mounted to a mounting hole 90 member provided at a peripheral portion of the opening at the upper portion of main body 12. Mounting hole 90 corresponds to a card insertion port 80. Preventing member 88 is located at the insertion opening 82 of the card insertion port 80 in a state in which preventing member 88 is inserted in mounting hole 90 and mounted. Preventing member 88 engages with PCMCIA card 84 within card insertion port 80 so as to prevent removal of PCMCIA card 84. Further, preventing member 88 (mounting hole 90) corresponds to an end portion of keyboard 22 when keyboard 22 is closed. When keyboard 22 is closed in a state in which preventing member 88 is mounted in mounting hole 90, preventing member 88 is covered by keyboard 22 and cannot be removed from the exterior of the main body 12.

A description will now be given of the operation of the present embodiment in a case in which PCMCIA card 84 and either HDD pack 34 or FDD pack 38, which are freely installable and removable, are installed in personal computer 10.

Figure 4:
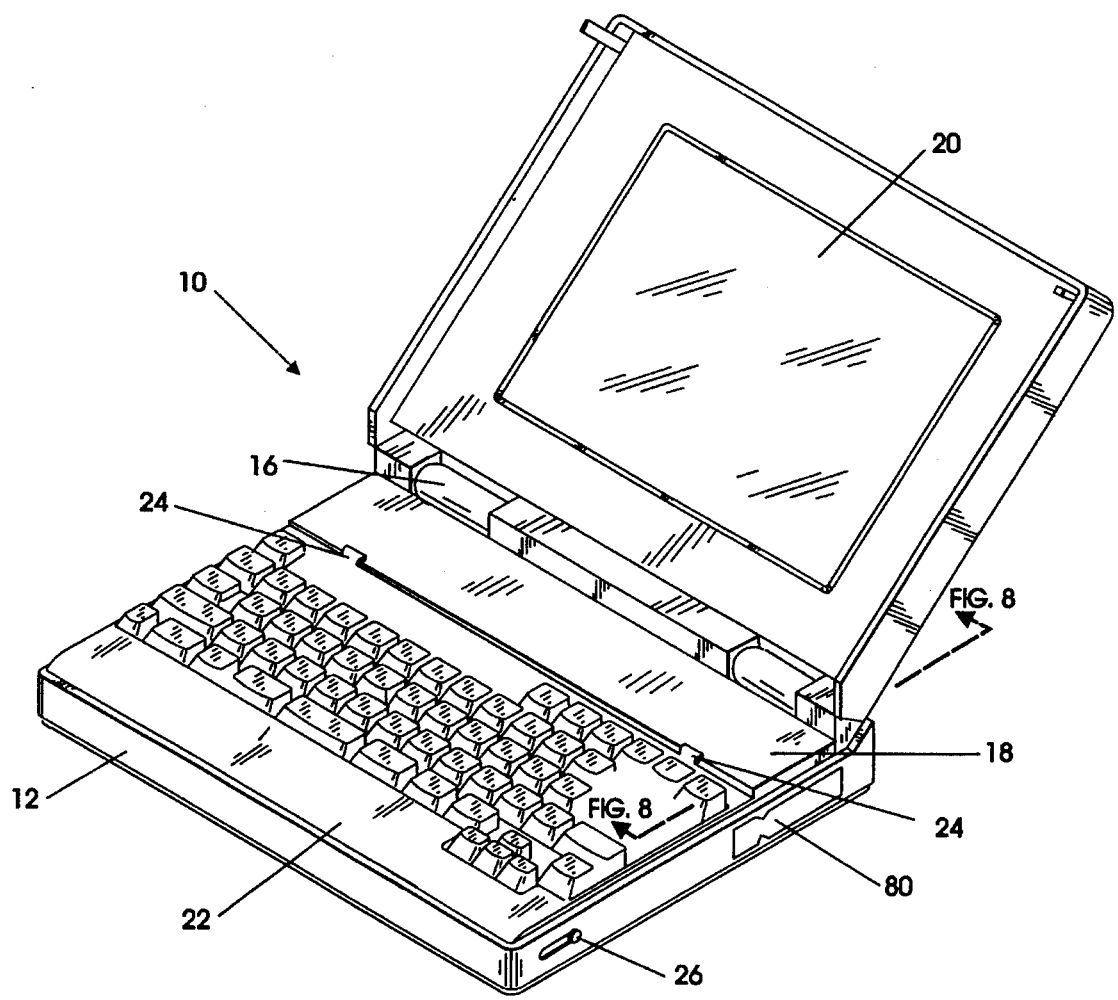
FIG. 4 illustrates a perspective view showing a state in which the keyboard of the personal computer relating to the embodiment of the present invention is closed and the personal computer is used.
Figure 5:
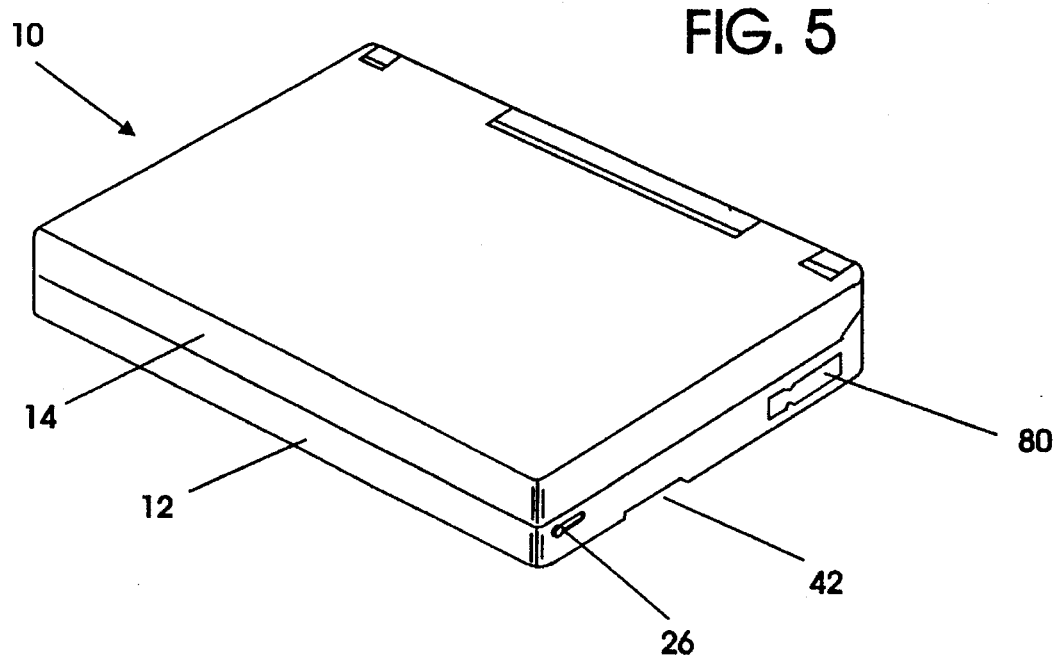
FIG. 5 illustrates a perspective view showing a state in which a cover of the personal computer relating to the embodiment of the present invention is closed and the personal computer is not being used.

As shown in FIG. 5, a personal computer 10 is illustrated in a state in which cover 14 is closed and personal computer 10 is not used. First, opening/closing operating latch 26 is operated in one of the two steps. Accordingly, the engaged state between main body 12 and cover 14 of personal computer 10, which is in a state of non-use, is released. Next, cover 14 is pivoted around the pair of projections 16 in the direction moving away from main body 12 so as to be opened (the state shown in FIG. 4). As shown in FIG. 8, when cover 14 is opened, holding member 46 (sliding portion 47) secured to keyboard 22 is spaced apart from partition wall 32.

Next, second step operation of the opening/closing operating latch 26 is illustrated. Accordingly, the engaged state between main body 12 and keyboard 22 is released. Then, keyboard 22 is pivoted around the pair of projections 24 in a direction moving away from main body 12 so as to be opened. As keyboard 22 is gradually opened, sliding portion 47 comes into contact with partition wall 32 as shown in FIG. 7, and holding member 46 elastically deforms (the state shown in FIG. 3). Further, when keyboard 22 is opened so as to be set substantially upright (the state shown in FIG. 2), holding member 46 (sliding portion 47) vertically engages partition wall 32 as shown in FIG. 6. As a result, keyboard 22 is held by holding member 46 in the state in which keyboard 22 is opened and stands substantially upright (the state shown in FIG. 2). In this state, keyboard 22 is prevented from being unnecessary moved in a closing direction, and the interior of main body 12 is exposed.

Therefore, when a device such as an HDD pack 34 or an FDD pack 38 accommodated within main body 12 is installed to and removed (replaced) from main body 12, keyboard 22 does not hamper operations for installing and removing the device.

Next, HDD pack 34, FDD pack 38 and the like are inserted within the opening at the upper portion of main body 12 so as to be accommodated within main body 12. Thereafter, keyboard 22 is pivoted around the pair of projections 24 in a direction of approaching main body 12, which is opposite to the previously-described direction. Keyboard 22 is thereby closed. As a result, personal computer 10 is again set in the state shown in FIG. 4. HDD pack 34, FDD pack 38 and the like accommodated within the main body 12 are then covered by keyboard 22.

PCMCIA card 84 is inserted from a side portion of main body 12 (insertion opening 82) and accommodated within card insertion port 80. When the PCMCIA card 84 is accommodated within card insertion port 80, preventing member 88 is inserted in mounting hole 90 so as to be mounted to main body 12 before keyboard 22 is closed as shown in FIG. 4. Consequently, preventing member 88 is located at insertion opening 82 of card insertion port 80. Preventing member 88 engages with PCMCIA card 84 within card insertion port 80 so as to prevent PCMCIA card 84 from being removed from the interior, regardless of operation of eject button 86. Further, when keyboard 22 is closed in a state in which the preventing member 88 is mounted, preventing member 88 is covered by keyboard 22 so as to prevent removal of preventing member 88.

Moreover, when keyboard 22 is closed in this manner, movable member 62 provided within main body 12 slides along guide 60 due to operation of operating projecting portion 68 of movable member 62. As shown in FIG. 11, tip end engaging portion 64 fits into the engaging hole 30 of engaging projection 28 and locking hole 66 is exposed outside main body 12. As a result, keyboard 22 is prevented from being opened.

In other words, devices such as HDD pack 34 and FDD pack 38 may be accommodated within main body 12 and preventing member 88 mounted to main body 12 and are covered by keyboard 22 which is maintained in a closed state by movable member 62. The devices and preventing member 88 are thereby prevented from being removed from the interior. Locking hole 66 (a portion exposed to the exterior) of the tip end engaging portion 64 of movable member 62, which maintains keyboard 22 in a closed state, is locked by an appropriate chain, key or the like. Accordingly, movement of movable member 62, that is, opening of keyboard 22, and removal of preventing member 88 are reliably prevented. As a result, HDD pack 34 or FDD pack 38 accommodated within main body 12 as well as PCMCIA card 84 accommodated within card insertion port 80 can be prevented from being arbitrarily removed.

According to the illustrated embodiment, PCMCIA card 84 accommodated within card insertion port 80 of main body 12 is prevented from being removed from the interior by preventing member 88. In addition, preventing member 88 is covered by keyboard 22 and is prevented from being removed from the interior. Further, keyboard 22 is maintained in a closed state by movable member 62 so as to be prevented from being opened. Consequently, arbitrary removal of PCMCIA card 84 accommodated within card insertion port 80 and devices such as HDD pack 34 or FDD pack 38 accommodated within main body 12 can be prevented. Such prevention can be realized in a simple structure and at a low cost. Moreover, even if a plurality of devices such as HDD pack 34 are accommodated within main body 12, a single movable member 62 can prevent each device from being arbitrarily removed from main body 12. Similarly, even if a plurality of PCMCIA cards 84 are accommodated within card insertion portions 80, a single preventing member 88 can prevent each PCMCIA card 84 from being arbitrarily removed from card insertion portions 80.

While the present embodiment employs a notebook-type personal computer as an example of information processing apparatus, the present invention is not limited to the same and may be applied to a desktop-type personal computer or various other types of information processing apparatuses.

While the invention has been particularly shown and described with reference to a preferred embodiment, it will be understood by those skilled in the art that various changes in form and detail may be made therein without departing from the spirit and scope of the invention.

We claim:

1. An information processing apparatus comprising:
   a main body having an opening therein into which a device for processing information is accommodated so as to be installable and removable therefrom;
   a locking aperture within said main body which corresponds to said opening within said main body;
   a preventing member freely mountable to and removable from said main body, said preventing member for insertion within said locking aperture within said main body wherein said device for processing information is prevented from being removed from said opening within said main body when said preventing member is mounted within said locking aperture within said main body;
   a cover mounted to said main body so as to be freely openable and closeable, said cover preventing removal of said preventing member from said locking aperture within said main body when said cover is closed; and
   a movable member mounted within said main body, said movable member being movable between a first state in which a portion of said movable member is exposed outside of said main body and a second state in which said portion of said movable member is withdrawn into said main body, wherein in said first state in which said portion of said movable member is exposed outside of said main body, said movable member engages said cover so as to prevent said cover from opening.

2. The information processing apparatus according to claim 1, wherein said portion of said movable member which is exposed outside of said main body while said movable member is at said first state includes a locking aperture for receiving a restraining device.

3. The information processing apparatus according to claim 1, said cover including a keyboard mounted thereto.

\* \* \* \* \*